(12) United States Patent
Fu et al.

(10) Patent No.: US 12,137,072 B1
(45) Date of Patent: Nov. 5, 2024

(54) DUPLICATE MESSAGE FILTERING IN A MULTI-REGION ACTIVE-ACTIVE ARCHITECTURE

(71) Applicant: Zoom Video Communications, Inc., San Jose, CA (US)

(72) Inventors: Jian Fu, Hefei (CN); Daofu Huang, Hefei (CN); Zhuo Li, Hangzhou (CN); Xiaohuan Pan, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/370,477

(22) Filed: Sep. 20, 2023

(51) Int. Cl.
*H04L 51/212* (2022.01)
*H04L 51/07* (2022.01)

(52) U.S. Cl.
CPC ............ *H04L 51/212* (2022.05); *H04L 51/07* (2022.05)

(58) Field of Classification Search
None
See application file for complete search history.

(56) References Cited

U.S. PATENT DOCUMENTS

| | | | |
|---|---|---|---|
| 2011/0276636 A1* | 11/2011 | Cheng | H04L 69/18 709/206 |
| 2022/0353326 A1* | 11/2022 | Yang | H04L 67/1034 |
| 2023/0353649 A1* | 11/2023 | Oh | H04L 67/306 |
| 2023/0394377 A1* | 12/2023 | Yu | G06Q 10/02 |
| 2024/0056528 A1* | 2/2024 | Swerdlow | H04M 3/42195 |
| 2024/0073054 A1* | 2/2024 | Hong | H04L 12/1822 |

* cited by examiner

*Primary Examiner* — June Sison
(74) *Attorney, Agent, or Firm* — Kilpatrick Townsend & Stockton LLP

(57) ABSTRACT

Systems and methods of message filtering in a multi-region multi-active architecture. A client device via a client application receives a data message associated with a topic subscribed by the client application from an application service provider. The data message includes a region tag associated with a region server producing the data message and an account tag representing a group of client accounts associated with the data message. The client device determines whether the region tag corresponds to a home region server assigned to the client application. In response to determining the region tag corresponds to the home region server assigned to the client application, the client device determines whether an account identification (ID) corresponding to the client application matches the account tag in the data message. In response to determining the account ID matches the account tag, the client device consumes the data message.

20 Claims, 9 Drawing Sheets

```
Task<DemoTask> task = new Task<>();
task.setPayload(demoTask);
........
//set Filter Parameter
task.addFilterParam("accountid", "7800001");
task.addFilterParam("region", getRegion());
```

FIG. 5

```
asyncRpQaConsumer.setConsumerFilter(subscriber, new RAConsumerFilter() {
    @Override  605
    public boolean filter(String zone, Map<String, String> filterParams) {
        String accountId = filterParams.get("accountId");

return false;
    }  610
});
boolean ret = mqReceptionService.mqConsumerFilter(zone,accountId,taskEntity.getTaskContext());
```

705  "regions":[{"name":"va1"},{"name":"va2"},{"name":"va3"}],
      "name":"openapi-qss","defaultRegion":{"name":"va1"},
      "lastEventTime":1687845040028,
      "failoverStatus":{"va1":"va2","va2":"va3","va3":"va3"},
      "services":["zdm"]
```

DUPLICATE MESSAGE FILTERING IN A MULTI-REGION ACTIVE-ACTIVE ARCHITECTURE

FIELD

The present application generally relates to multi-region multi-active architecture and more specifically relates to message filtering in a multi-region multi-active architecture.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 5 shows an example code executed at a region server for adding an account tag and a region tag in a data message;

FIG. 6 shows an example code in a client application for filtering a data message based on tags included in the data message;

DETAILED DESCRIPTION

Figure 1:
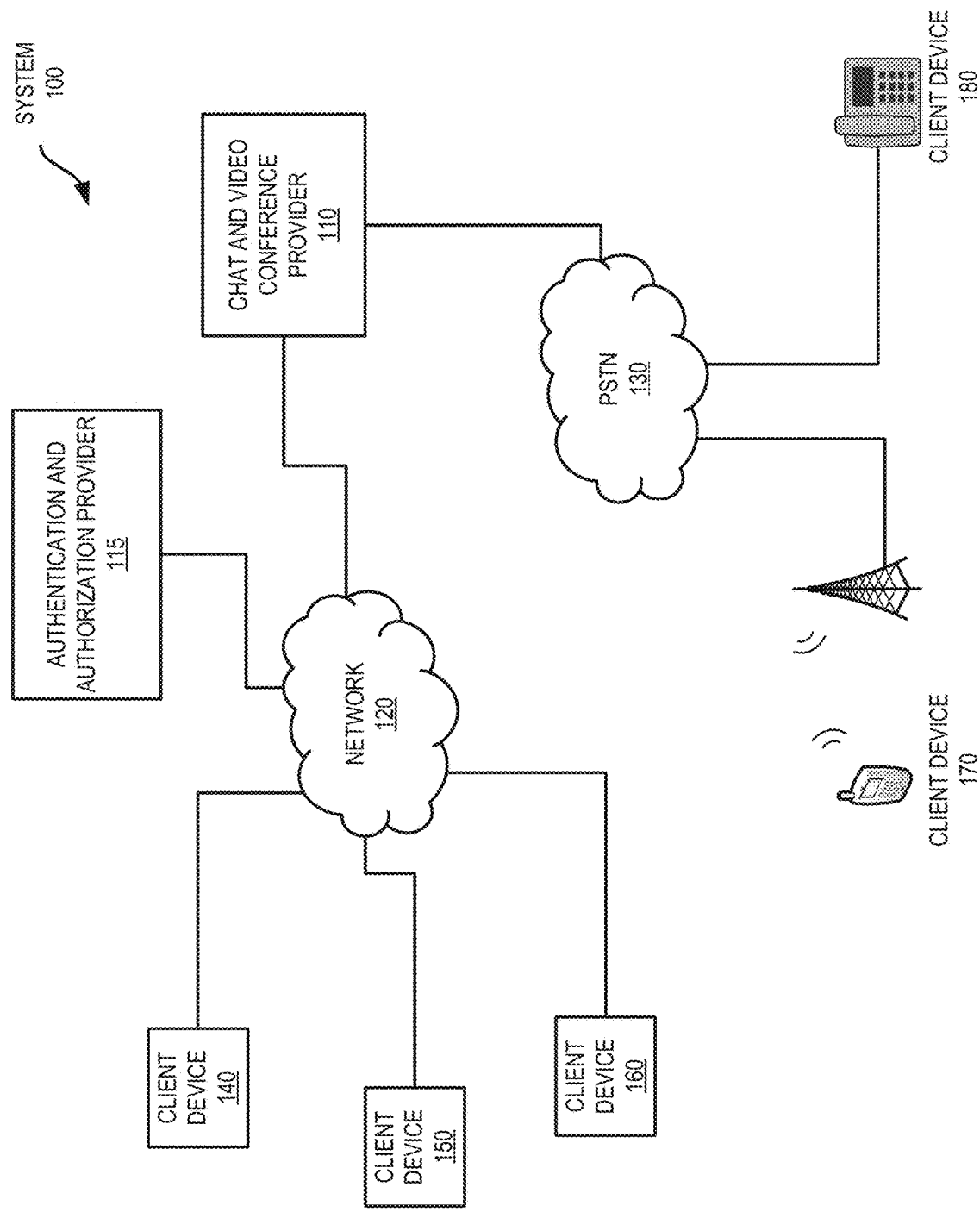
FIG. 1 shows an example system that provides chat and videoconferencing functionality to various client devices.

Examples are described herein in the context of message filtering in a multi-region multi-active architecture. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Cloud-based application service providers often use a multi-region multi-active architecture to reduce latency and ensure high availability. The multi-region multi-active architecture deploys an asynchronous message queue in global mode as a crucial middleware to transmit messages from servers (producers) in different regions to client applications (consumers) subscribed to the same topic. However, integrating the asynchronous message queue in a multi-region multi-active architecture may cause a client application to receive duplicate messages from the multiple active regions, leading to malfunction of consumer applications. For example, a payment service provider implements a multi-region multi-active architecture, where each region has a server. When two or three region servers are active, a client application may receive duplicate messages from the two or three active region servers and end up paying two or three times for one service.

To address the issue of client applications consuming duplicate messages from multiple active regions, region information and client account information are added in messages produced by different region servers. Correspondingly, on the consumer side, region-specific consumer groups are created, and message filters based on region information and client account information are implemented to support proper message consumption in the multi-region multi-active architecture.

For example, a cloud-based application service provider deploys three region servers in three different regions R1, R1, R3. Correspondingly, three consumer groups subscribed to the same topic can be created based on their geographical regions, such as aa_topic_group_r1, aa_topic_group_r2, and aa_topic_group_r3. Each consumer group is designated to consume messages from a corresponding region server. For example, consumer group aa_topic_group_r1 consumes messages from region server in region R1, consumer group aa_topic_group_r2 consumes messages from region server in region R2, and consumer group aa_topic_group_r3 consumes messages from region server in region R3.

When a region server produces a message, it can insert its region information in the message. A consumer application that subscribes to messages related to a topic from the region server can apply a region filter to filter out messages from other region servers and consume only messages from its designated region server. This can ensure that messages are consumed where they are produced, enabling localized message processing. In addition, it also allows for cross region consumption. For example, if a consumer group is from region R3, it can be set to consume messages from region server in region R3. Alternatively, it can be set to consume messages from region server in region R2. This flexibility enables efficient message distribution and processing across different regions as needed.

In addition, when a region server produces a message, it can also add an account range in the message, indicating the message is for consumer accounts within the account range. Correspondingly, a consumer application can apply an account filter to filter out messages whose account range does not include the consumer account for the consumer application. This allows for filtering messages at the account level, ensuring that each consumer account only receives and processes message relevant to its operations or user base.

When one region server fails, a corresponding consumer group can be manually or automatically assigned to another region server, so that the corresponding consumer group can continue to receive proper messages and operate. For example, a cloud-based application provider has three consumer groups aa_topic_group_r1, aa_topic_group_r2, and aa_topic_group_r3, configured to consume messages from three different region servers in regions R1, R2, and R3 respectively. When the server in region R1 fails, the corresponding consumer group aa_topic_group_r1, which originally consumes messages from region R1, can fall back to region R2. Messages from the server in region R1 paused, and the consumer group aa_topic_group_r1 starts to consume messages from the server in region R2. Region R1 is still the home region of the consumer group aa_topic_group_r1. The server in region R2 can produce messages for both consumer groups aa_topic_group_r1 and aa_topic_r2 until the server in region R1 becomes active again.

By implementing message filtering through multiple dimensions, such as regions, account IDs, or any other relevant criteria to filter and route message accurately, messages can be consumed by appropriate consumer applications based on their specific requirements and characteristics. By leveraging multiple dimensions for message filtering, the solution provides a robust framework for efficient and precise message consumption in a multi-region multi-active architecture setup. This approach enhances scalability, fault tolerance, and targeted message processing, ultimately improving the overall performance and reliability of cloud-based application services.

This illustrative example is given to introduce the reader to the general subject matter discussed herein and the disclosure is not limited to this example. The following sections describe various additional non-limiting examples and examples of message filtering in a multi-region multi-active architecture.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
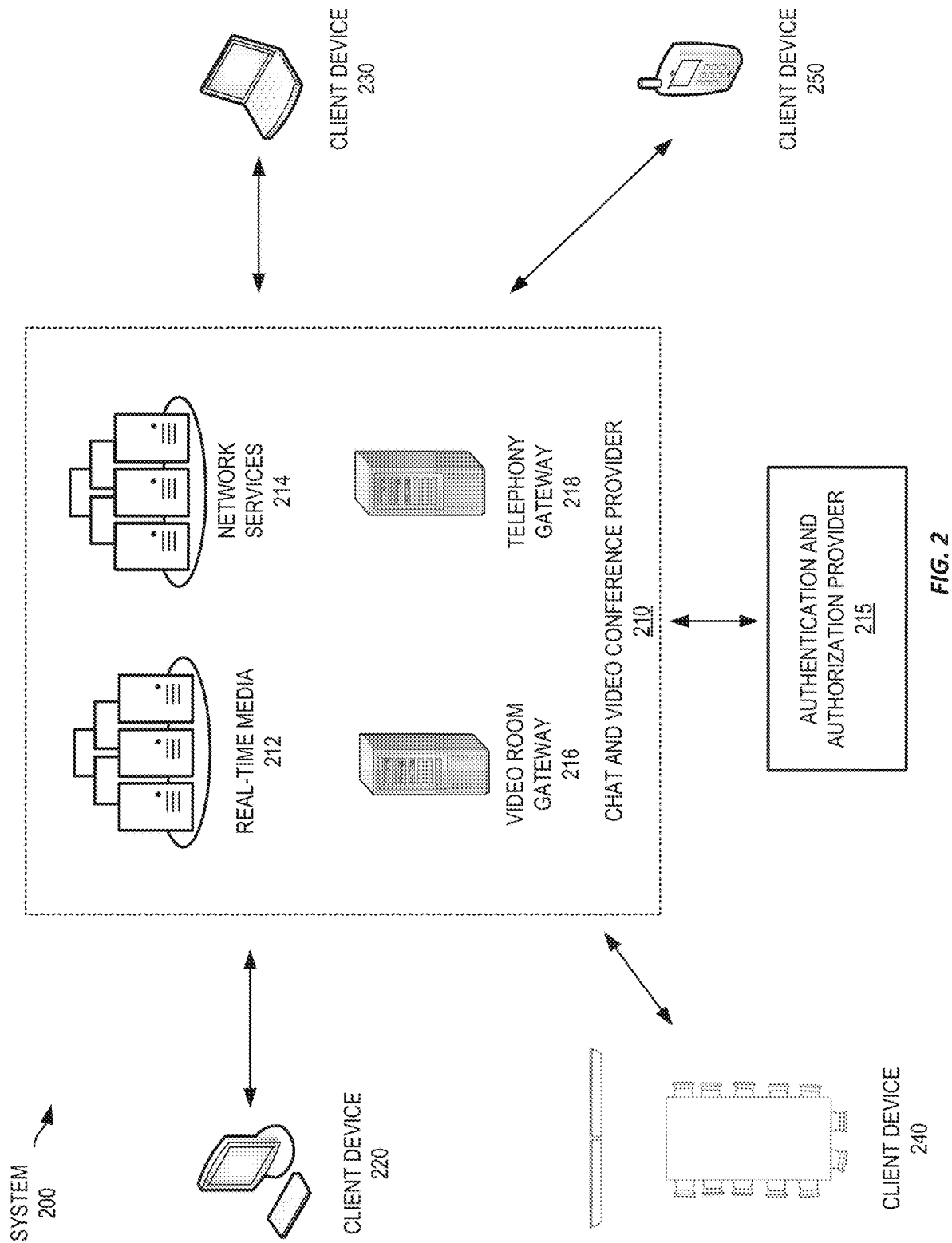
FIG. 2 shows an example system in which a chat and video conference provider provides chat and videoconferencing functionality to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it.

Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
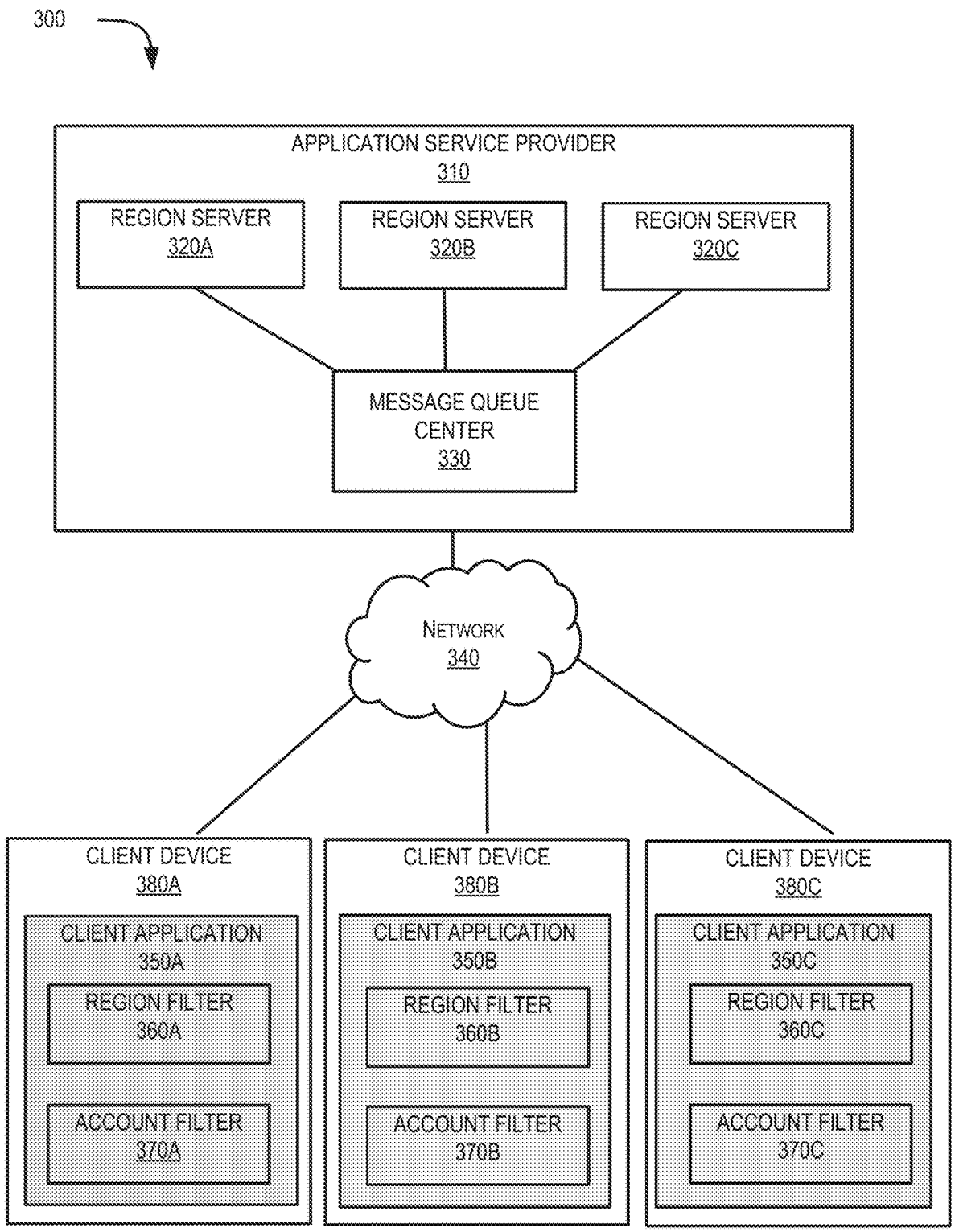
FIG. 3 shows an example system for duplicate message filtering.

Referring now to FIG. 3, FIG. 3 shows an example system 300 for duplicate message filtering. In this example system 300, an application service provider 310 is in network communication with multiple client devices 380A, 380B, 380C via a network 340. In this example, the network 340 is the internet, however, any suitable communications network or combination of communications network may be employed, including LANs (e.g., within a corporate private LAN) and WANs, similar to the network 110 illustrated in FIG. 1. The application service provider 310 can be the chat and video conference provider 110 illustrated in FIG. 1 or the chat and video conference provider 210 illustrated in FIG. 2. However, the application service provider 310 is not limited to providing chat and video conferencing functionalities only. Instead, the application service provider 310 can provider any suitable cloud-based functionalities. Client devices 380A, 380B, 380C (which may be referred to herein individually as a client device 380 or collectively as the client devices 380) are installed with client applications 350A, 350B, 350C (which may be referred to herein individually as a client application 350 or collectively as the client application 350) provided by the application service provider 310.

In this example, the application service provider 310 includes multiple region servers, such as 320A, 320B, 320C, which can be located in three different geographical regions. All region servers can be active to serve client devices 380 installed with client applications 350. Thus, the application service provider 310 has a multi-region multi-active architecture to provide high availability and reduce latency. Each region server 320 can be assigned as a home server to serve a specific region and a specific client group and as a backup server or failover server to serve certain regions and client groups when corresponding home servers fail, which will be described in detail in FIG. 4.

Each region server 320 is configured to include region information associated with the region server 320, such as a region tag representing a geographical region that a region server 320 serves. A region server 320 can be assigned to a group of clients in the same region as the home region server. That is, client devices associated with a group of clients in one region communicates with the region server in the same region. Alternatively, or additionally, a region server 320 can be assigned to a group of clients in a different region. For example, region server 320A is in region A, it can be assigned to a group of client devices located in region A, such as client device 380A located in region A, as their home region server. Alternatively, region server 320A can be assigned to a group of client devices located in region B, such as client device 380B located in region B, as their home region server.

Each region server 320 is also configured to include client account information associated with a client group assigned to the region server 320 in the messages produced. The client account information can be a group of client accounts. Alternatively, the client account information is a hash value range derived from the group of client accounts. Client accounts can be partitioned using a hash-range partitioning operation to create different data ranges representing client accounts assigned to consume messages from a corresponding region server. Alternatively, or additionally, a region server can add any suitable additional information or tag in a message that can facilitate proper message consumption at different client applications, for example a code name or identification (ID) of the region server.

The application service provider 310 also includes a message queue center 330. The message queue center 330 can include an asynchronous message queue of messages from different region servers 320A, 320B, 320C. Client devices 380 can fetch messages from the message queue center 330.

A client device 380 is installed with a client application 350 associated with a client account. The client account can belong to a client group that is assigned to a region server as its home server. When the home server is active, the client device only consumes messages that are produced from its home server and designated to the client account associated with the client device 380. The client application 350 includes a region filter to filter out messages not from the client application's assigned server (e.g., home region server) and an account filter to filter out messages that are not designated to the client account associated with the client application.

For example, client application 350A includes a region filter 360A configured to determine if the region information included in a message matches the region information associated with the client device 380A installed with the client application 350A. For example, region server 320 produces messages for client devices installed with client applications and located in region A. If the client device 380A is in region A, the region information associated with the client device 380A then matches the region information included a message from region server A. The region filter 360A then does not filter out the message. If the client device 380A is not in region A, the region information associated with the client device 380A does not match the region information included a message from region server 320A. The region filter 360A then filters out the message. In some examples, a group of client applications includes information about the assigned region server, such as the region where the region server is located. The group of client applications may or may not be located in same region as the region server. For example, the region filter 360A in a client application 350A can determine if the region information included in a message produced by the region server 320A corresponds to the information about the region server assigned to the client application 350A. If the region information in the message matches the information about the region server assigned to the client application 350A, the region filter 360A does not filter out or discard the message. If region information in the message does not match the information about the region server assigned to the client application 350A, the region filter 360 filters out or discards the message.

Client application 350A also includes an account filter 370A configured to determine if an account associated with the client application 350 installed in the client device 380A matches the client account information included in a message received or fetched from the message queue center 330. In some examples, the client account information included in a message represents a group of accounts. If the account associated with client application 350A is in the group of accounts represented by the account information, the account filter 370A determines that the client application 350A can consume the message. Otherwise, the account filter 370 filters out or discard the message without consuming the message.

In some examples, the client account information included in a message is a hash value range derived from the group of accounts. An account filter at a consumer application can implement a hash function to convert an account ID to obtain a hash value. If the hash value of the account ID does not fall in the hash value range for the account IDs assigned to a corresponding region server, the account filter can filter out or discard the message from the region server. If the hash value falls in the hash value range, the consumer application can consume the message from the region server. For example, a region server 320A produces a message for a set of consumer account IDs assigned to the region server 320A, where the set of consumer account IDs can be represented by a hash value range. An account filter 370A in client application 350A can determine if the account ID associated with client application 350A, which can be converted into a hash value, falls into the set of consumer account IDs assigned to region server 320A, which is represented by a hash value range. If the hash value is within the hash value range, the client application 350A can consume the message from region server 320A. If the hash value of the account ID is not within the hash value range for the set of consumer account IDs, even if the client application 350A subscribes to messages from the region server 320A, the account filter may filter out or discard the message without consuming the message.

Client application 350A can also include other filter corresponding to other information or tag included in messages from a region server. For example, the ID of a region server is included in the messages produced by the region server. The client application 350A includes ID of the region server that is assigned to the client application 350. The client application 350A includes a server ID filter. If the server ID included in the message matches the server ID associated with the client application, the server ID filter may not filter out the message. Otherwise, the server ID filter can filter out or discard the message without consuming. Thus, the client applications 350 provided by the application service provider 310 can implement a multi-dimensional message filtering scheme to support proper message consumption in a multi-region multi-active architecture.

Figure 4:
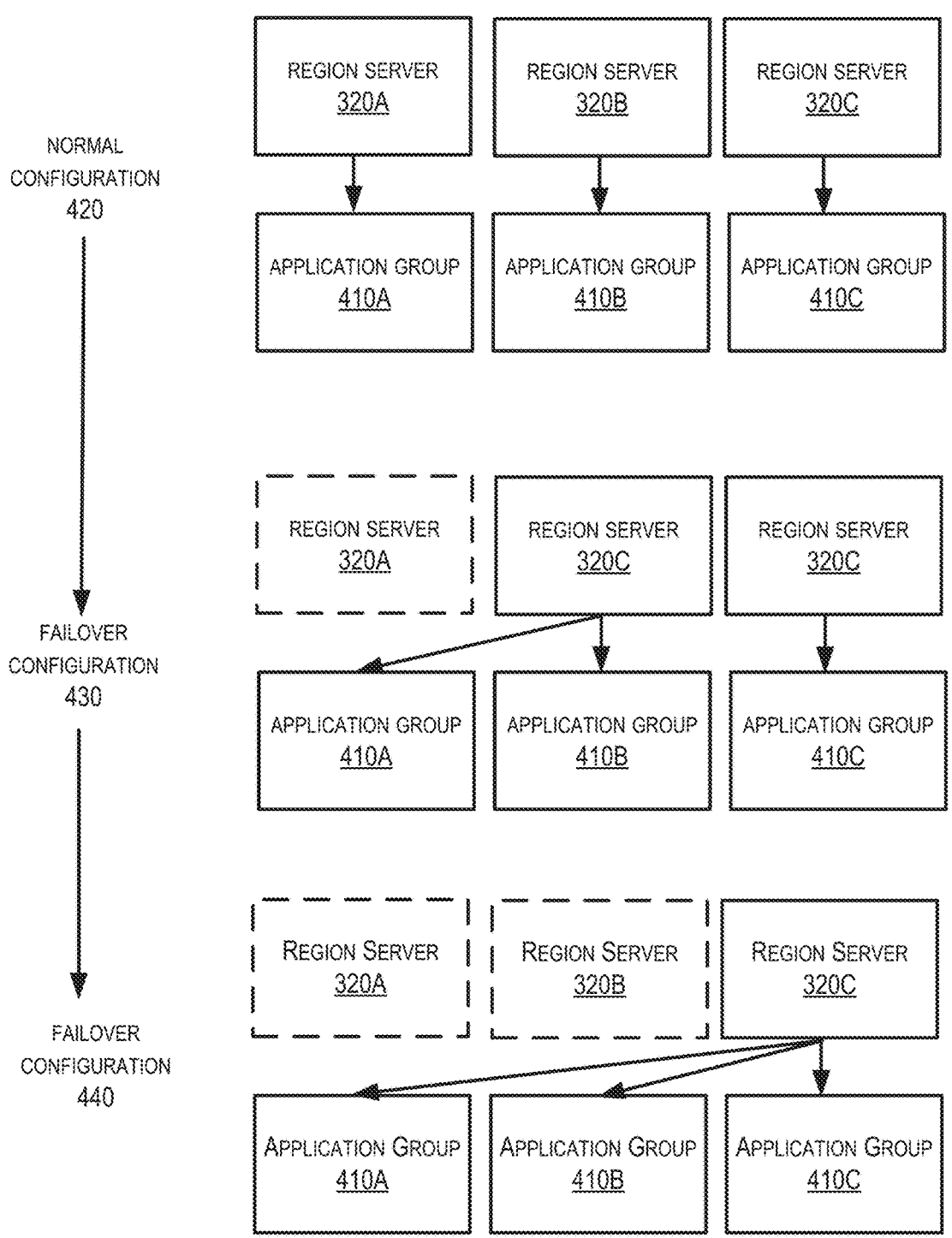
FIG. 4 shows an example diagram illustrating a multi-region multi-active architecture under different operation status.

Referring now to FIG. 4, FIG. 4 shows an example diagram 400 illustrating a multi-region multi-active architecture under different operation status. The multi-region multi-active architecture includes three region servers 320A, 320B, 320C located in three different geographical regions. In normal configuration 420, each region server 320A, 320B, 320C is active. Region server 320A is the home region server for application group 410A, and a backup region server for application group 410B and application group 410C. Application group 410A includes a group of client applications 350 that are assigned to consume messages from its home region server 320A when region server 320A is active. However, application group 410B and application group 410C do not consume messages from region server 320A if corresponding home region servers are active.

Region server 320B is the home region server for application group 410B, and a backup region server for application group 410A and application group 410C. Application group 410B includes a group of client applications 350 that are assigned to consume messages from its home region server 320B when region server 320B is active. However, application group 410A and application group 410C do not consume messages from region server 320B if corresponding home region servers are active.

Region server 320C is the home region server for application group 410C, and a backup region server for application group 410A or application group 410B. Application group 410C includes a group of client applications 350 that are assigned to consume messages from its home region server 320C. However, application group 410A and application group 410B do not consume messages from region server 320C if corresponding home region servers are active.

In failover configuration 430, where region server 320A is down, application group 410A whose home region server is region server 320A start to consume messages from its backup region server 320B. In this situation, both application group 410A and application group 410B consume messages from region server 320B. However, region server 320A is still the home region server for application group 410A. When region server 320A is back on active, application group 410A can resume consuming messages from region server 320A.

In failover configuration 440, both region server 320A and region server 320B are down, application group 410A and application group 410B start to consume messages from their backup region server 320C. In this situation, all of application groups 410A, 410B, and 410C consume messages from region server 320C. However, region server 320A is still the home region server for application group 410A and region server 320B is still the home region server for application group 410B. When region server 320B is back on active, application group 410B can resume consuming messages from region server 320B. Application group 410A may keep consuming messages from region server 320C or switch to consume messages from region server 320B, when region server 320B is back on active, based on system configuration or manual intervention.

Failover configuration 430 and failover configuration 440 are just examples configurations. There can be other configurations. For example, when region server 320A is down, application group 410A can be configured to consume messages from region server 320C. FIG. 4 does not illustrate the failover configurations if only region server 320B is down, if only region server 320C is down, or if region server 320A and region server 320C are down, or if region server 320B and region server 320C are down. However, different failover configurations can become obvious to an ordinary person skill in the art after seeing failover configuration 430 and failover configuration 440.

Referring now to FIG. 5, FIG. 5 shows an example code 500 executed at a region server 320 for adding an account tag and a region tag in a data message. The example code 500 includes a "setPayload" task 505 configured to set the content of the data message. The example code 500 includes an "addFilterParam" task 510 configured to add an account tag 515 in the data message and set the account tag 515 as a message filtering parameter at a client application. In this example, the account tag 515 is an account ID. However, the account tag 515 can be other types of values, for example, an account rage, or a hash value range representing the account range. The example code 500 also includes another "addFilterParam" task 520 configured to add a region tag in the data message and set the region tag as a message filtering parameter at a client application 350 associated with the region server 320. In this example, the region tag is extracted by a "getRegion" operator 525. However, the account tag can be directly inserted in the "addFilterParam" task 520 to be added in the data message and set as a message filtering parameter at the client application 350 associated with the region server 320.

Referring now to FIG. 6, FIG. 6 shows an example code 600 in a client application 350 for filtering a data message based on tags included in the data message. In this example, the example code 600 includes a filter operator 605 to determine whether an account associated with the client application matches the account tag included in the data message, for example the account tag set in FIG. 5. If the account associated with the client application matches the account tag set in the data message, the filter operator 605 returns false, meaning no filtering. In addition, the example code 600 can also include another filter operator (not shown) to determine if the region tag (if there is one) in a data message matches the home region (zone) of the client application. If the region tag matches the client application's home region, then the example code 600 obtains the content of the data message by executing a return value operator 610.

Figure 7:
FIG. 7 shows an example command message from an application service provider for a failover configuration.

Referring now to FIG. 7, FIG. 7 shows an example command message 700 from an application service provider 310 for a failover configuration. The example command message 700 can be sent to all the region servers when a region server fails. The example command message can also send the command message to the client accounts whose home region server or backup region server fails. In this example, the failover status 705 indicates that region server va1 fails and its backup server is va2. When the region server va2 receives the command message 700, the region server va2 can start to produce messages for the client accounts whose home region server is va1. In some examples, the region server va2 can include the client accounts whose home region server is va1 in the account tag in its data messages. Meanwhile, the client accounts whose home region server is va1 can also receive the command message 700 from the application service provider 310. The client accounts then start to consume messages from region server va2.

Figure 8:
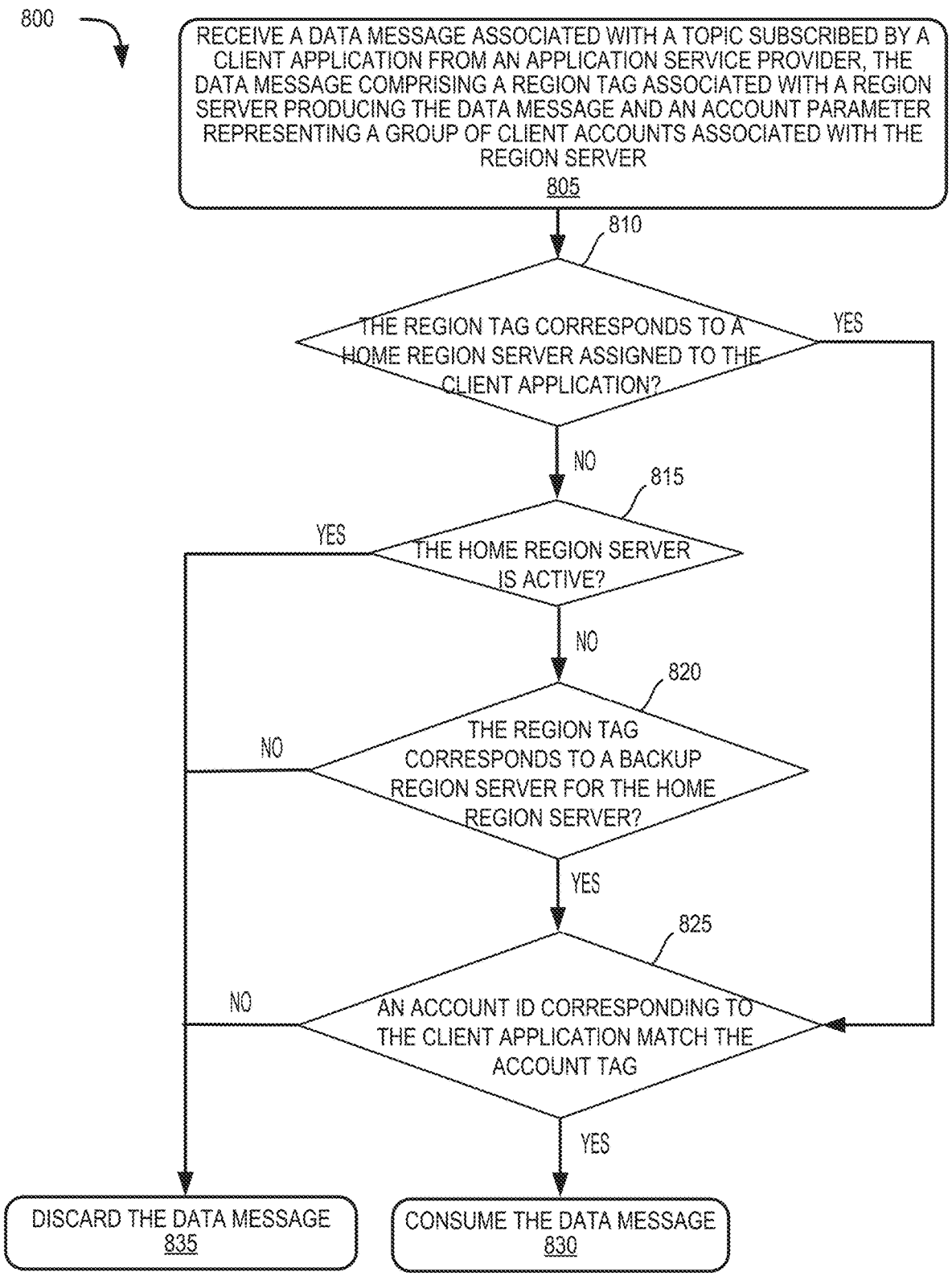
FIG. 8 shows an example process for message filtering in a multi-region multi-active architecture.

Referring now to FIG. 8, FIG. 8 shows an example process 800 for duplicate message filtering in a multi-region multi-active architecture. The example method 800 will be discussed with respect to the system 300 shown in FIG. 3; however, any suitable system with a multi-region multi-active architecture may be used.

At block 805, a client device 380 receives a data message associated with a topic subscribed by a client application 350 installed on the client device 380 from an application service provider 310. The data message comprises a region tag associated with a region server producing the data message and an account tag representing a group of client accounts associated with the region server. The application service provider 310 can assign a home region server for a client application 350 installed on a client device 380 and a backup (fallback or failover) region server if the home region server is inactive (or fails). The application service provider 310 can include multiple region servers 320 configured to produce data messages for the same topic subscribed by different client devices 380. The data messages can be stored in a message queue, for example an asynchronous message queue at a message queue center 330. The client application 350 installed on a client device 380 can fetch a data message at the message queue based on the topic that the client application 350 subscribes to.

At block 810, the client device 380 determines whether the region tag corresponds to a home region server assigned to the client application 350. The region tag is added to the data message by a region server 320 that produced the data message. The region tag can be a code or a name representing a geographical region where the region server serves. The client device 380 can access information about the region server assigned to the client application 350. A region filter 360 in the client application 350 installed on the client device 380 can determine whether the region tag corresponds to a home region server assigned to the client application, generally as described in FIG. 3. For example, if the region tag corresponds to a home region server assigned to the client application 350, it indicates the data message is produced by the client application's home region center. The region filter 360 may not discard the data message, and the process 800 proceeds to block 825, which will be described below in detail. If the region tag does not correspond to a home region server assigned to the client application 350, the process 800 proceeds to block 815.

At block 815, the client device 380 determines if the home region server is active. If the home region server fails, the application service provider 310 can automatically or manually assign and configure a backup region server for a group of client applications whose home region server is the failed region server. In some examples, the application service provider 310 sends a message, including the inactive status of the home region server and an identification of the backup region server, to the group of client applications. The group of client application can consume messages from the backup region server while the home region server is inactive. A client device 380 installed with a client application 350 can determine whether the home region server is active or inactive based on the message from the application service provider 310. Alternatively, or additionally, the client application 350 can query a name service database of the application service provider 310 for server information. If the home region server is active, the client application 350 is only allowed to consume messages from the home region server. Data message associated with the same topic can be duplicate messages from another region servers. The process 800 then proceeds to block 835, where the client device 380 discards the data message. If the home region server is inactive, the client device 380 can consume messages from the backup region server for the failed home region server. The process 800 proceeds to block 820.

At block 820, the client device 380 determines whether the region tag corresponds to a backup region server for the home region server. The client device 380 and the installed client application 350 can receive a message from the application service provider about the identification of the backup region server. Alternatively, the client device 380 can query a name service database for information about the backup region server. The region filter 360 in the client application 350 installed on the client device 380 can whether the region tag corresponds to a backup region server for the home region server, generally as described in FIG. 3. For example, if the region filter 360 determines that the region tag in the data message does not correspond to the backup region server for the home region server, it indicates that the data message is not from the backup region server. The process 800 the proceeds to block 835, where the client device 380 discards the data message. If the region filter 360 determines that the region parameter corresponds to the backup region server for the home region server, the process proceeds to block 825.

At block 825, the client device 380 determines whether an account ID corresponding to the client application matches the account tag. The account tag is added to the data message by a region server that produces the data message. The account tag can be an account range representing a plurality of client accounts that can consume the data message. The account range can also be a hash value range converted from the account rage representing the plurality of client accounts that can consume the data message. In some examples, the region server produces data messages for a subset of the client applications subscribed to the same topic and adds the account tag specifying the client accounts for the subset of the client applications. If the region server that produced the data message is the home region server for the client application, or if the region server that produced the data message is the backup region server for a failed home region server for the client application, the account filter 370 in the client application installed on the client device 380 can further determine whether the account ID corresponding to the client application is in the account range specified in the account tag, generally as described in FIG. 3. For example, if an account ID corresponding to the client application 350 is not in the account range, the process 800 proceeds to step 735, where the account filter 370 filters out the data message and the client device 380 discards the data message. If an account ID corresponding to the client application 350 is in the account range, the process 800 proceeds to block 830.

At block 830, the client device 380 consumes the data message. The client application 350 installed on the client device 380 can extract the content in the data message and execute certain logic to perform corresponding actions based on the content of the data message.

The example process 800 illustrates a method of message filtering in a multi-region multi-active architecture. However, not every step in the example process 800 may be needed, certain steps may follow a different order, or other suitable parameters or tags can be added or checked to determine if a client device should consume a data message. For example, the region tag can be optional if the account tag in a data message specifies the client accounts that can consume a corresponding data message. Also for example, a server ID tag can be added to data messages and used as a filter parameter for message filtering at the client device 380.

Figure 9:
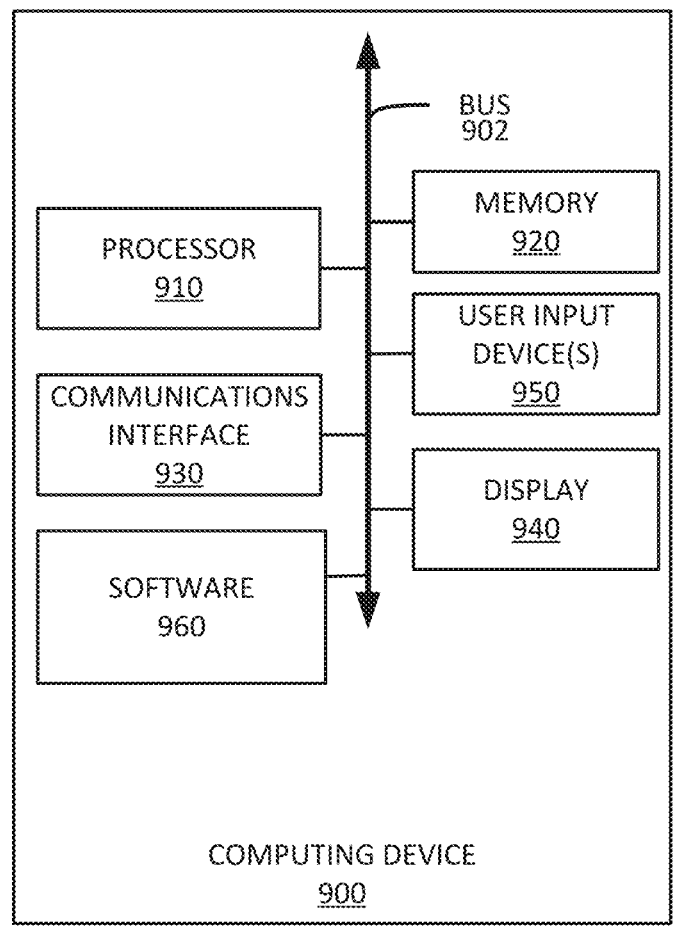
FIG. 9 shows an example computing device suitable for use with example systems and methods for message filtering.

Referring now to FIG. 9, FIG. 9 shows an example computing device 900 suitable for use in example systems or methods for message filtering according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for message filtering in a multi-region multi-active architecture according to different examples, such as part or all of the example method 800 described above with respect to FIG. 8. In some embodiments, the computing device may include software 960 for executing one or more methods described herein, such as for example, one or more steps of methods 800. The computing device 900, in this example, also includes one or more user input devices 950, such as a keyboard, mouse, touchscreen, microphone, etc., to accept user input. The computing device 900 also includes a display 940 to provide visual output to a user.

The computing device 900 also includes a communications interface 730. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, by a client device via a client application, a data message associated with a topic subscribed by the client application from an application service provider, the data message comprising a region tag associated with a region server producing the data message and an account tag representing a group of client accounts associated with the data message;
determining, by the client device via the client application, whether the region tag corresponds to a home region server assigned to the client application;
in response to determining the region tag corresponds to the home region server assigned to the client application, determining, by the client device via the client application, whether an account identification (ID) corresponding to the client application matches the account tag in the data message; and
in response to determining the account ID matches the account tag, consuming, by the client device via the client application, the data message.

2. The method of claim 1, wherein the application service provider comprises multiple region servers configured to produce data messages for the topic, wherein the application service provider is configured to assign a home region server to the client application and a backup region server for the home region server if the home region server is inactive.

3. The method of claim 2, further comprising fetching the data message from a message queue, wherein the message queue comprises a plurality of data messages from the multiple region servers.

4. The method of claim 1, wherein the region tag is a geographical region associated with the region server producing the data message, wherein the method further comprises:
in response to determining the region tag does not correspond to the home region server:
determining whether the home region server is active; and
in response to determining that the home region server is active, discarding the data message.

5. The method of claim 4, further comprising:
in response to determining that the home region server is inactive, determining whether the region tag corresponds to a backup region server for the home region server; and
in response to determining that the region tag corresponds to the backup region server for the home region server, determining, by the client device via the client application, whether the account ID corresponding to the client application matches the account tag in the data message.

6. The method of claim 5, further comprising:
in response to determining that the region tag does not correspond to the backup region server for the home region server, discarding the data message.

7. The method of claim 1, wherein the account tag is a hash value range for the group of client accounts, and wherein determining whether an account ID corresponding to the client application matches the account tag in the data message comprises:
generating a hash value for the account ID using a hash function; and
determining whether the hash value for the account ID is in the hash value range for the group of client accounts.

8. The method of claim 7, further comprising:
in response to determining that the hash value for the account ID is in a hash range for the group of client accounts associated with the group of client accounts, consuming the data message.

9. The method of claim 7, further comprising:
in response to determining the account ID is not in a account range represented by the account tag in the data message, discarding the data message.

10. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
receive a data message associated with a topic subscribed by a client application from an application service provider, the data message comprising a region tag associated with a region server producing the data message and an account tag representing a group of client accounts associated with the data message;
determine whether the region tag corresponds to a home region server assigned to the client application;
in response to determining the region tag corresponds to the home region server assigned to the client application, determine whether an account identification (ID) corresponding to the client application matches the account tag in the data message; and
in response to determining the account ID matches the account tag, consume the data message.

11. The system of claim 10, wherein the application service provider comprises multiple region servers configured to produce data messages for the topic, wherein the application service provider is configured to assign a home region server to the client application and a backup region server for the home region server if the home region server is inactive.

12. The system of claim 11, wherein the one or more processors are configured to execute further processor-executable instructions stored in the non-transitory computer-readable medium to:
fetch the data message from a message queue, wherein the message queue comprises a plurality of data messages from the multiple region servers.

13. The system of claim 10, wherein the region tag is a geographical region associated with the region server producing the data message, wherein the one or more processors are configured to execute further processor-executable instructions stored in the non-transitory computer-readable medium to:
in response to determining the region tag does not correspond to the home region server:
determine whether the home region server is active; and
in response to determining that the home region server is active, discard the data message.

14. The system of claim 13, wherein the one or more processors are configured to execute further processor-executable instructions stored in the non-transitory computer-readable medium to:
in response to determining that the home region server is inactive, determine whether the region tag corresponds to a backup region server for the home region server; and
in response to determining that the region tag corresponds to the backup region server for the home region server, determine whether the account ID corresponding to the client application matches the account tag in the data message.

15. The system of claim 10, wherein the account tag is a hash value range for the group of client accounts, and wherein determining whether an account ID corresponding to the client application matches the account tag in the data message comprises:
  generating a hash value for the account ID using a hash function; and
  determining wherein the hash value for the account ID is in the hash value range for the group of client accounts.

16. The system of claim 15, wherein the one or more processors are configured to execute further processor-executable instructions stored in the non-transitory computer-readable medium to:
  in response to determining that the hash value for the account ID is in a hash range for the group of client accounts associated with the group of client accounts, consume the data message.

17. A non-transitory computer-readable medium comprising processor-executable instructions configured to cause one or more processors to:
  receive a data message associated with a topic subscribed by a client application from an application service provider, the data message comprising a region tag associated with a region server producing the data message and an account tag representing a group of client accounts associated with the data message;
  determine whether the region tag corresponds to a home region server assigned to the client application;
  in response to determining the region tag corresponds to the home region server assigned to the client application, determine whether an account identification (ID) corresponding to the client application matches the account tag in the data message; and
  in response to determining the account ID matches the account tag, consume the data message.

18. The non-transitory computer-readable medium of claim 17, further comprising processor-executable instructions configured to cause one or more processors to:
  in response to determining the region tag does not correspond to the home region server:
  determine whether the home region server is active; and
  in response to determining that the home region server is active, discard the data message.

19. The non-transitory computer-readable medium of claim 18, further comprising processor-executable instructions configured to cause one or more processors to:
  in response to determining that the home region server is inactive, determine whether the region tag corresponds to a backup region server for the home region server; and
  in response to determining that the region tag corresponds to the backup region server for the home region server, determine whether the account ID corresponding to the client application matches the account tag in the data message.

20. The non-transitory computer-readable medium of claim 17, wherein the account tag is a hash value range for the group of client accounts, and wherein determining whether an account ID corresponding to the client application matches the account tag in the data message comprises:
  generating a hash value for the account ID using a hash function; and
  determining wherein the hash value for the account ID is in the hash value range for the group of client accounts.

* * * * *